US012217693B2

(12) United States Patent
Chen

(10) Patent No.: US 12,217,693 B2
(45) Date of Patent: Feb. 4, 2025

(54) PIXEL DRIVING CIRCUIT AND DISPLAY PANEL

(71) Applicant: TCL CHINA STAR OPTOELECTRONICS TECHNOLOGY CO., LTD., Guangdong (CN)

(72) Inventor: Xiaolong Chen, Guangdong (CN)

(73) Assignee: TCL CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 17/623,433

(22) PCT Filed: Dec. 24, 2021

(86) PCT No.: PCT/CN2021/141167
§ 371 (c)(1),
(2) Date: Jun. 22, 2023

(87) PCT Pub. No.: WO2023/108796
PCT Pub. Date: Jun. 22, 2023

(65) Prior Publication Data
US 2024/0046875 A1 Feb. 8, 2024

(30) Foreign Application Priority Data
Dec. 16, 2021 (CN) ......................... 202111547422.7

(51) Int. Cl.
*G09G 3/3258* (2016.01)
*G09G 3/3233* (2016.01)
(Continued)

(52) U.S. Cl.
CPC ......... *G09G 3/3258* (2013.01); *G09G 3/3233* (2013.01); *G09G 3/3266* (2013.01);
(Continued)

(58) Field of Classification Search
CPC ......... G09G 3/3233; G09G 2300/0819; G09G 2300/0861; G09G 2300/0842;
(Continued)

(56) References Cited

U.S. PATENT DOCUMENTS 11,508,315 B2 * 11/2022 Kim ..................... G09G 3/3233
2016/0163255 A1 * 6/2016 Kim ..................... G09G 3/3291
345/212
(Continued)

FOREIGN PATENT DOCUMENTS

CN 104409047 A 3/2015
CN 108831384 A 11/2018
(Continued)

OTHER PUBLICATIONS

International Search Report in International application No. PCT/CN2021/141167, mailed on Aug. 29, 2022.
(Continued)

*Primary Examiner* — Dismery Mercedes
(74) *Attorney, Agent, or Firm* — PV IP PC; Wei Te Chung

(57) ABSTRACT

A pixel driving circuit and a display panel are provided by the present application. An electrical potential of a control terminal of a driving module can be kept stable through a detection module by connecting the detection module with a control terminal of the driving module when detecting a threshold voltage of the driving module. In this way, an obtained threshold voltage of the driving module is accurate, to make the threshold voltage of the driving module can be accurately compensated, and a display uniformity and a stability of the display panel are improved.

15 Claims, 8 Drawing Sheets

(51) Int. Cl.
*G09G 3/3266* (2016.01)
*G09G 3/3275* (2016.01)
*G09G 3/3291* (2016.01)

(52) U.S. Cl.
CPC ......... *G09G 3/3275* (2013.01); *G09G 3/3291* (2013.01); *G09G 2300/043* (2013.01); *G09G 2300/0819* (2013.01); *G09G 2310/0251* (2013.01); *G09G 2320/0233* (2013.01); *G09G 2320/045* (2013.01)

(58) Field of Classification Search
CPC ........... G09G 2320/045; G09G 3/3266; G09G 3/3258; G09G 2310/061; G09G 2320/0233; G09G 2310/0264; G09G 2300/043; G09G 2320/0295; G09G 2300/0828; G09G 2300/0833; G09G 2310/0251; G09G 3/3291; G09G 2310/0262; G09G 3/3275; G09G 2320/0693
See application file for complete search history.

(56) References Cited

U.S. PATENT DOCUMENTS

| | | | | |
|---|---|---|---|---|
| 2017/0069268 | A1* | 3/2017 | Tokunaga | G09G 3/3266 |
| 2017/0221420 | A1* | 8/2017 | Zhu | G09G 3/3233 |
| 2018/0137819 | A1* | 5/2018 | An | G09G 3/3233 |
| 2019/0156747 | A1* | 5/2019 | Nie | G09G 3/3233 |
| 2019/0180675 | A1* | 6/2019 | Jang | G09G 3/32 |
| 2020/0020278 | A1* | 1/2020 | Lee | G09G 3/3275 |
| 2020/0035161 | A1* | 1/2020 | Chen | G09G 3/3233 |
| 2020/0294451 | A1* | 9/2020 | Kim | G09G 3/3291 |
| 2020/0358161 | A1* | 11/2020 | Shin | H01P 1/2088 |
| 2021/0043148 | A1* | 2/2021 | Lee | G09G 3/3291 |
| 2022/0358880 | A1* | 11/2022 | Yonebayashi | G09G 3/3233 |

FOREIGN PATENT DOCUMENTS

| | | | |
|---|---|---|---|
| CN | 109166524 | A | 1/2019 |
| CN | 110349542 | A | 10/2019 |
| CN | 110503920 | A | 11/2019 |
| CN | 111429842 | A | 7/2020 |
| CN | 112086056 | A | 12/2020 |
| CN | 112201207 | A | 1/2021 |
| KR | 20180058268 | A | 6/2018 |
| KR | 20210058232 | A | 5/2021 |
| WO | 2015132834 | A1 | 9/2015 |

OTHER PUBLICATIONS

Written Opinion of the International Search Authority in International application No. PCT/CN2021/141167, mailed on Aug. 29, 2022.

Chinese Office Action issued in corresponding Chinese Patent Application No. 202111547422.7 dated Sep. 27, 2022, pp. 1-9.

Japanese Office Action issued in corresponding Japanese Patent Application No. 特願2022-502152 dated Feb. 19, 2024, pp. 1-4.

* cited by examiner

PIXEL DRIVING CIRCUIT AND DISPLAY PANEL

FIELD OF INVENTION

The present application relates to display technologies, and more particularly, to a pixel driving circuit and a display panel.

BACKGROUND OF INVENTION

Organic light-emitting diodes (OLED) are a kind of current-type organic light-emitting devices that emit light through an injection and a recombination of carriers, and a luminous intensity is proportional to an injected current.

In an OLED display panel, each pixel includes an organic light emitting diode and a pixel driving circuit for driving the organic light emitting diode. In the pixel driving circuit, a formula of the current flowing through the driving transistor is $I=K(Vgs-Vth)^2$, wherein K is an intrinsic conductivity factor of the driving transistor, Vgs is a gate-source potential difference of the driving transistor, Vth is a threshold voltage of the driving transistor. Therefore, it can be seen that a current flowing through the driving transistor, that is, the current used to drive the organic light-emitting diode to emit light, is related to the threshold voltage of the driving transistor. However, due to uneven manufacturing process of the display panel, the threshold voltage of each driving transistor may be different, resulting in uneven display brightness. In addition, with the use of the display panel, the transistors will age and change, making the threshold voltages of each of the transistors drift, and aging degrees of each of driving transistors are different, so the threshold voltage drift degrees of each of driving transistors are also different, which will also cause unstable and uneven display brightness.

In view of the above-mentioned problems, currently, the threshold voltage of the driving transistor is generally compensated by the pixel driving circuit, so that the driving current flowing through the organic light emitting diode is independent of the threshold voltage of the driving transistor. However, the current pixel driving circuit generally detects the threshold voltage of the driving transistor by detecting the gate-source potential difference of the driving transistor when the driving transistor is turned off. However, because the threshold voltage is detected only by coupling a storage capacitor between the gate electrode and the source electrode of the drive transistor to maintain a gate potential of the drive transistor to maintain an on-state of the driving transistor. Therefore, a gate electrode potential tends to drop and become unstable, to make the detected threshold voltage of driving transistor finally is also not accurate.

Therefore, it is necessary to propose a new pixel driving circuit, so that when the driving transistor is detected, the gate electrical potential of the driving transistor can be kept stable, to accurately detect the threshold voltage of the driving transistor.

SUMMARY OF INVENTION

In order to solve the above-mentioned problem, embodiments of the present application provide a pixel driving circuit, including: a driving module, a data writing module, an initialization module, a first capacitor, and a detection module wherein a control terminal of the driving module is connected to a first node, and wherein an input terminal of the driving module is connected to a constant voltage terminal of high electrical potential, and wherein an output terminal is connected to a second node;

- wherein a control terminal of the data writing module is connected to a first scan signal line, and wherein an input terminal of the data writing module is connected to a data signal line, and wherein an output terminal of the data writing module is connected to the first node;
- wherein a control terminal of the initialization module is connected to a second scan signal line, and wherein an input terminal of the initialization module is connected to a reset signal line, and wherein an output terminal of the initialization module is connected to the second node;
- wherein a first terminal of the first capacitor is connected to the first node, and wherein a second terminal of the first capacitor is connected to the second node; and
- wherein the detection module is connected to the first node and is configured to control an electrical potential of the first node to obtain a threshold voltage of the driving module.

In addition, one embodiment of the present application also provides a display panel that includes an organic light-emitting diode and the pixel drive circuit described above. The organic light emitting diode is coupled between the output terminal of the driving module of the pixel driving circuit and the constant voltage terminal of low electrical potential, to make the pixel driving circuit configured to drive the organic light emitting diode to emit light.

In the pixel driving circuit and the display panel provided by the embodiments of the present application, a driving module is connected to a control terminal of the driving module, so that an electrical potential of control terminal of the driving module can be kept stable through a detection module when a threshold voltage of the driving module is obtained. In this way, a detected threshold voltage of the driving module is accurate, so that the threshold voltage of the driving module can be accurately compensated, and the display uniformity and stability of the display panel are improved.

DESCRIPTION OF FIGURES

The technical solutions and other beneficial effects of the present application will be made obvious by describing in detail the specific embodiments of the present application in conjunction with the accompanying figures.

DETAILED DESCRIPTION OF EMBODIMENTS

The technical solutions in the embodiments of the present application will be clearly and completely described below in conjunction with the figures in the embodiments of the present application. Obviously, the described embodiments are only a part of the embodiments of the present application, rather than all the embodiments. Based on the embodiments of the present application, all other embodiments obtained by those skilled in the art without inventive steps shall fall within a protection scope of the present application.

It should be noted that in the embodiments of the present application, in order to distinguish the other two terminals of each module except a control terminal. One terminal is called an input terminal and another terminal is called an output terminal. Since the output terminal and the input terminal of each module are symmetrical, the input terminal and the output terminal are interchangeable.

In addition, in the embodiments of the present application, in order to distinguish other two electrodes other than a gate electrode of the transistor, one of the electrodes is referred to as a source electrode and another electrode is referred to as a drain electrode. Since the source electrode and the drain electrode of the transistor are symmetrical, the source electrode and drain electrode are interchangeable. According to the form in the figure, it is stipulated that a middle terminal of the transistor is the gate electrode, a signal input terminal is the source electrode, and a signal output terminal is the drain electrode. In addition, the transistors used in all the embodiments of the present application may include P-type and/or N-type transistors. The P-type transistor is turned on when the gate electrode is at a low electrical potential and turned off when the gate electrode is at a high electrical potential. The N-type transistor is turned on when the gate electrode is at the high electrical potential, and turns off when the gate electrode is at the low electrical potential.

Figure 1:
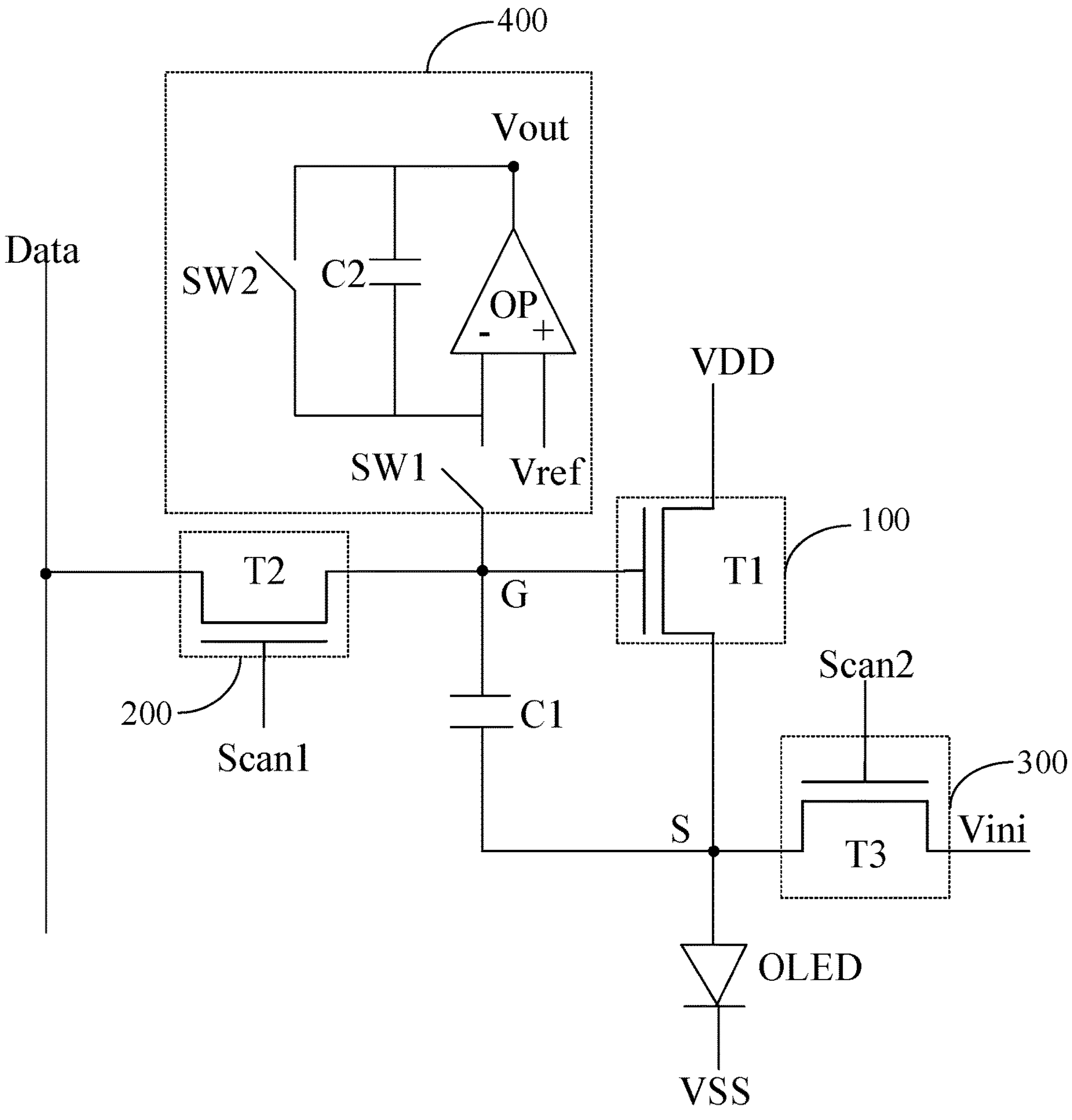
FIG. 1 is a circuit diagram of a pixel driving circuit provided by one embodiment of the present application.

As shown in FIG. 1, one embodiment of the present application provides a pixel driving circuit, including: a driving module 100, a data writing module 200, an initialization module 300, a first capacitor C1, and a detection module 400.

A control terminal of the driving module 100 is connected to a first node G. An input terminal of the driving module is connected to a constant voltage terminal of high electrical potential VDD. An output terminal is connected to a second node S.

A control terminal of the data writing module 200 is connected to a first scan signal line Scan1. An input terminal of the data writing module is connected to a data signal line Data. An output terminal of the data writing module is connected to the first node G.

A control terminal of the initialization module 300 is connected to a second scan signal line Scan2. An input terminal of the initialization module 300 is connected to a reset signal line Vini. An output terminal of the initialization module 300 is connected to the second node S.

A first terminal of the first capacitor C1 is connected to a first node G. A second terminal of the first capacitor C1 is connected to the second node S.

The detection module 400 is connected to the first node G and is configured to control an electrical potential of the first node G to detect and compensate the threshold voltage of the driving module 100.

The pixel driving circuit provided by the embodiment of the present application connects the detection module 400 to the control terminal of the driving module 100, so that the detection module 400 keeps the control terminal potential of the driving module 100 stable when the threshold voltage of the driving module 100 is obtained, so that the acquired threshold voltage of the driving module 100 is accurate, so that the threshold voltage of the driving module 100 can be accurately compensated, and the display uniformity and stability of the display panel are improved.

Please continue to refer to FIG. 1, the detection module 400 includes an operational amplifier OP, a first switch SW1, a second switch SW2, and a second capacitor C2. A first input terminal of the operational amplifier OP is connected to the first node G through the first switch SW1. A first switch SW1 is coupled between the first node G and the first input terminal of the operational amplifier OP. A second input terminal of the operational amplifier OP is connected to a reference signal line Vref. In this embodiment of the present application, the first input terminal of the operational amplifier OP is an inverting Input terminal (−), the second input terminal of the operational amplifier OA is a positive input terminal (+). The second switch SW2 and the second capacitor C2 are coupled between the first input terminal of the operational amplifier and an output terminal of the operational amplifier OP. The first terminal of the second capacitor C2 is connected to the output terminal of the operational amplifier OP. The second terminal of the second capacitor C2 is connected to the first input terminal of the operational amplifier OP.

Specifically, the electrical potentials of the first input terminal of the operational amplifier OP and the second input terminal of the operational amplifier OP can be kept substantially the same based on virtual short characteristics of the operational amplifier OP, and when the second switch SW2 is turned off, the operational amplifier OP and the second capacitor C2 constitute an integrator.

Figure 2:
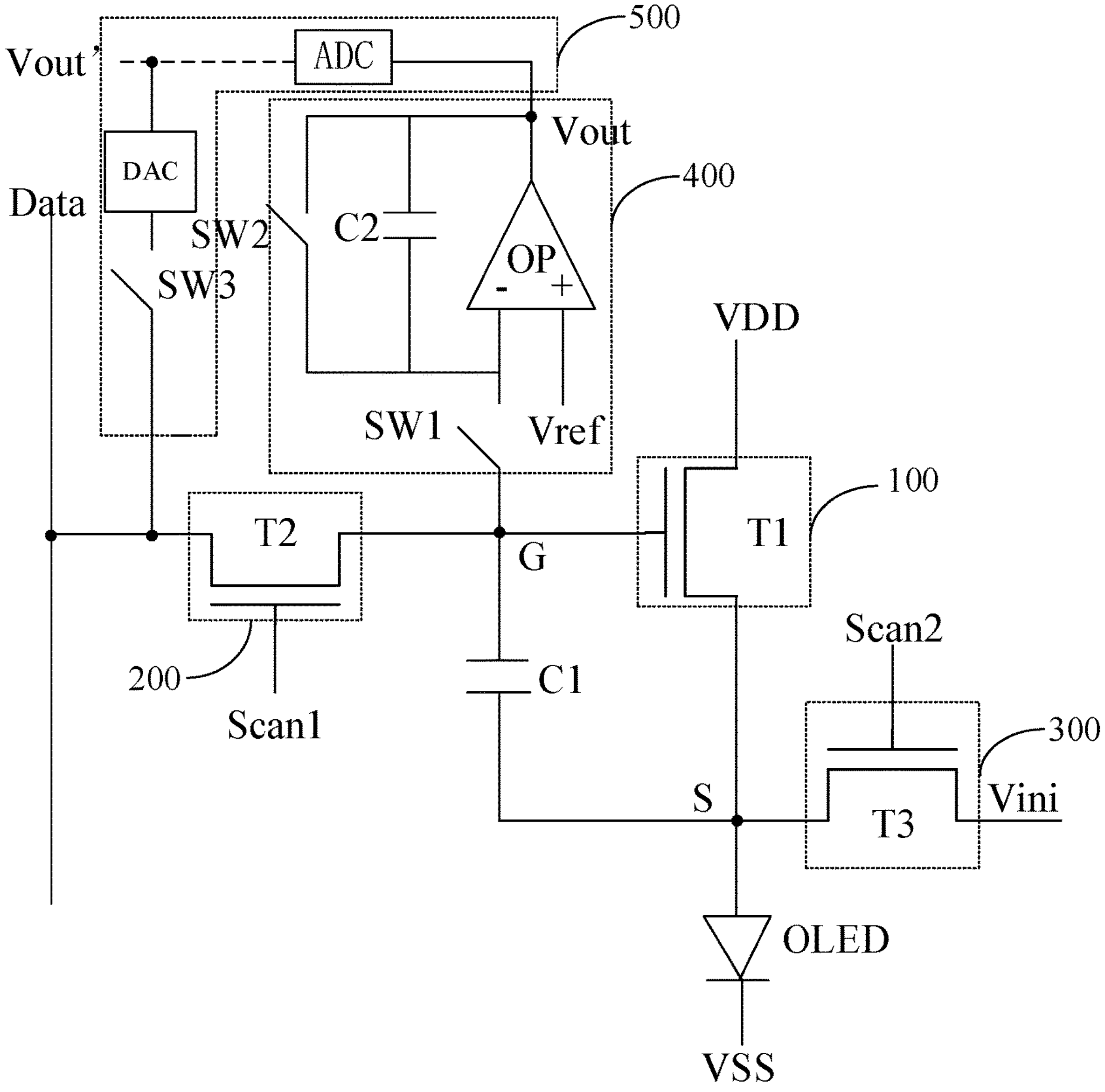
FIG. 2 is another circuit diagram of the pixel driving circuit provided by one embodiment of the present application.

Referring to FIG. 2, in some embodiments, the pixel driving circuit further includes a compensation module 500. The compensation module includes an analog-to-digital converter ADC, a digital-to-analog converter DAC, and a third switch SW3. An input terminal of the analog-to-digital converter ADC is connected to the output terminal of the operational amplifier OP. An output terminal of the digital-to-analog converter DAC is connected to an input terminal of the data writing module 200 through the third switch SW3, so that when the threshold voltage of the driving module 100 is compensated, the third switch SW3 is closed. The third switch SW3 is turned on, and the digital-to-analog converter DAC superimposes the threshold voltage of the driving module 100 into a data signal to cancel the threshold voltage Vth of the driving module 10 when compensate the threshold voltage of the driving module 100.

It should be noted that the analog-to-digital converter ADC and the digital-to-analog converter DAC generally include voltage comparators, control modules, memory and other devices (not shown in the figure), which are configured process the output voltage Vout of the integrator constituted by the operational amplifier OP and the second capacitor C2 to obtain the voltage Vout that needs to be compensated for the data signal Data, which is superimposed on the data signal Data to compensate the data signal Data.

Please continue to refer to FIG. 2, in some embodiments, the driving module 100 includes a first thin film transistor T1. A gate electrode of the first thin film transistor T1 is connected to the first node G. A source electrode of the first thin film transistor T1 is connected to the second node S. A drain electrode of the first thin film transistor T1 is connected to the constant voltage terminal of high electrical potential VDD.

In some embodiments, the data writing module 200 includes a second thin film transistor T2. A gate electrode of the second thin film transistor T2 of the second thin film transistor T2 is connected to the first scan signal line Scan1. A source electrode of the second thin film transistor T2 is connected to the data signal line Data. A drain electrode of second thin film transistor T2 is connected to the first node G.

In some embodiments, the initialization module 300 includes a third thin film transistor T3. A gate electrode of the third thin film transistor T3 is connected to the second scan signal line Scan2. A source electrode of the third thin film transistor T3 is connected to the reset signal line Vini. A drain electrode of the third thin film transistor T3 is connected to the second node S.

As shown in FIGS. 2, 3, 4, 5, and 8, the pixel driving circuit includes a threshold voltage detection stage A, wherein the threshold voltage detection stage includes a first period t1, a second period t2, and a third period t3.

Figure 3:
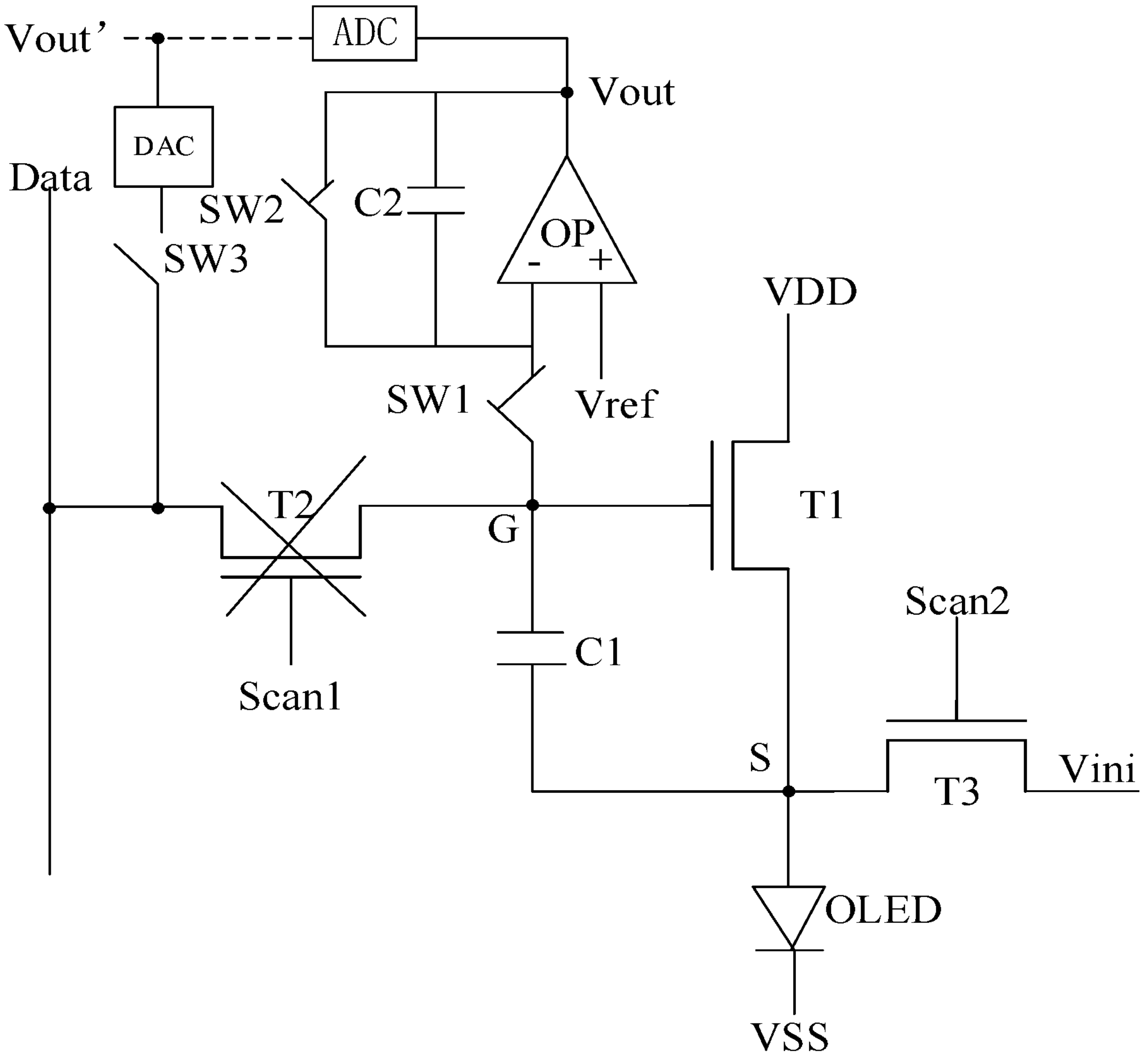
FIG. 3 is a state diagram of a first period of the pixel driving circuit provided by one embodiment of the present application.

As shown in FIG. 3, in the first period t1, the first switch SW1 and the second switch SW2 are turned on, the third switch SW3 is turned off, the data writing module 200 is turned off, and the initialization module 300 and the driving module 100 are turned on.

Figure 4:
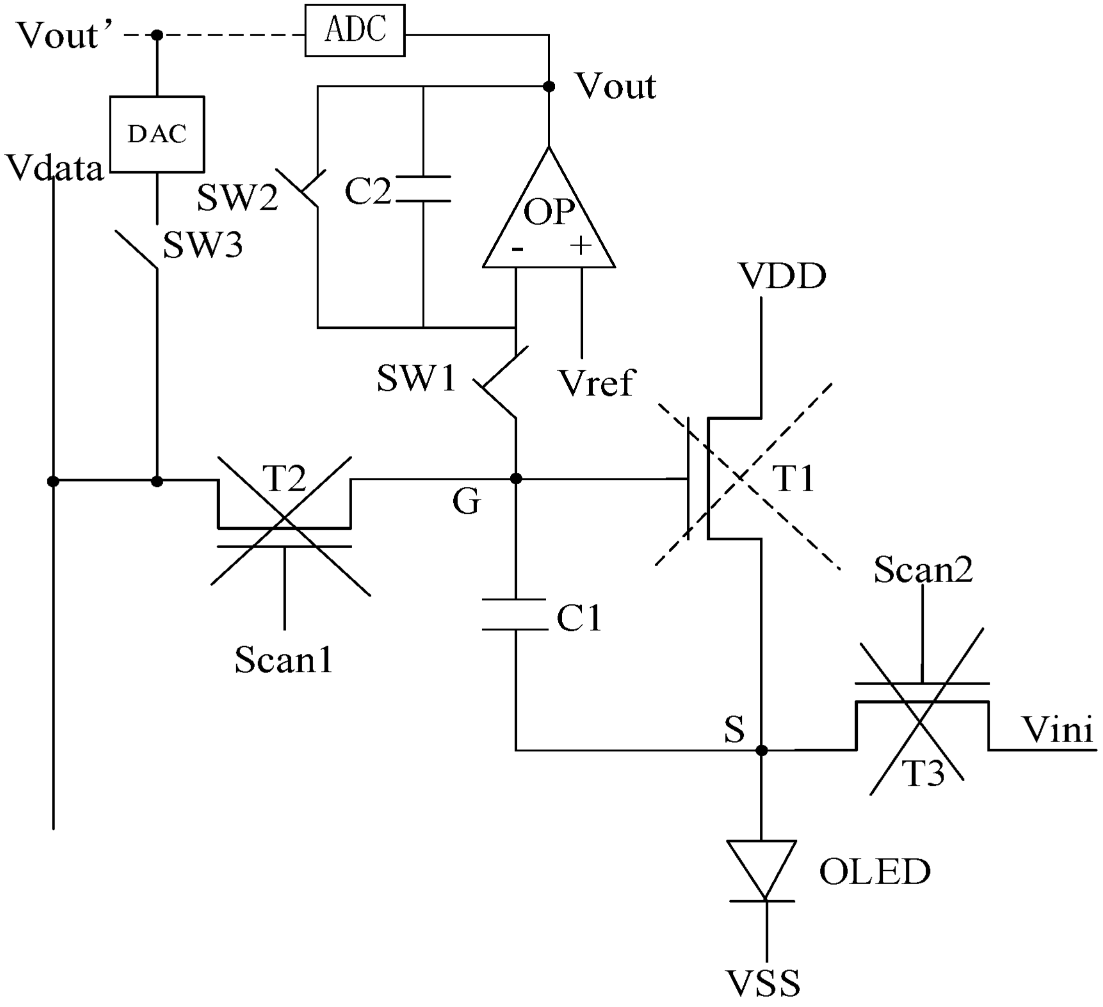
FIG. 4 is a state diagram of a second period of the pixel driving circuit provided by one embodiment of the present application.

As shown in FIG. 4, in the second time period t2, the first switch SW1 and the second switch SW2 are turned on, the third switch SW3 is turned off, the data writing module 200 and the initialization module 300 are turned off, and the driving module 100 changes from turned on to turned off.

Figure 5:
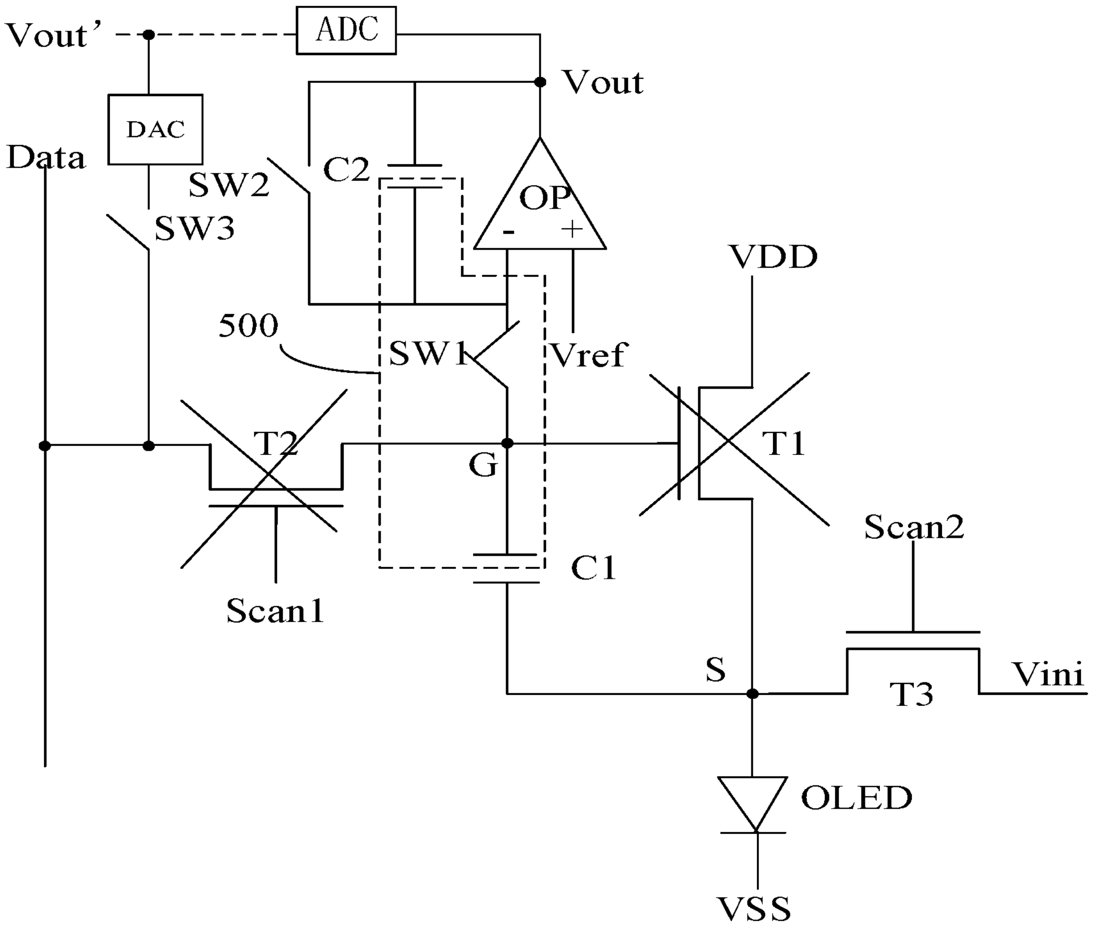
FIG. 5 is a state diagram of a third period of the pixel driving circuit provided by one embodiment of the present application.

As shown in FIG. 5, in the third period t3, the first switch SW1 is turned on, the second switch SW2 and the third switch SW3 are turned off, the data writing module 200 and the driving module 100 are turned off, and the initialization module 300 is turned on.

In the first time period t1, an electrical potential of the first node G is an electrical potential of the constant voltage terminal of high electrical potential VDD, and an electrical potential of the second node S is an electrical potential Vini of the reference signal line.

In the second period t2, the electrical potential of the first node G is the electrical potential Vref of the reference signal line, and the electrical potential of the second node S is a difference Vref−Vth between the electrical potential Vref of the reference signal line and a threshold voltage Vth of the driving module 100.

In the third period t3, the electrical potential of the first node G is the electrical potential Vref of the reference signal line, and the electrical potential of the second node S is the electrical potential Vini of the reference signal line.

Furthermore, as shown in FIGS. 2, 6, 7 and 8, the pixel driving circuit further includes a display compensation stage B, wherein the display compensation stage B includes a fourth period t4 and a fifth period t5.

Figure 6:
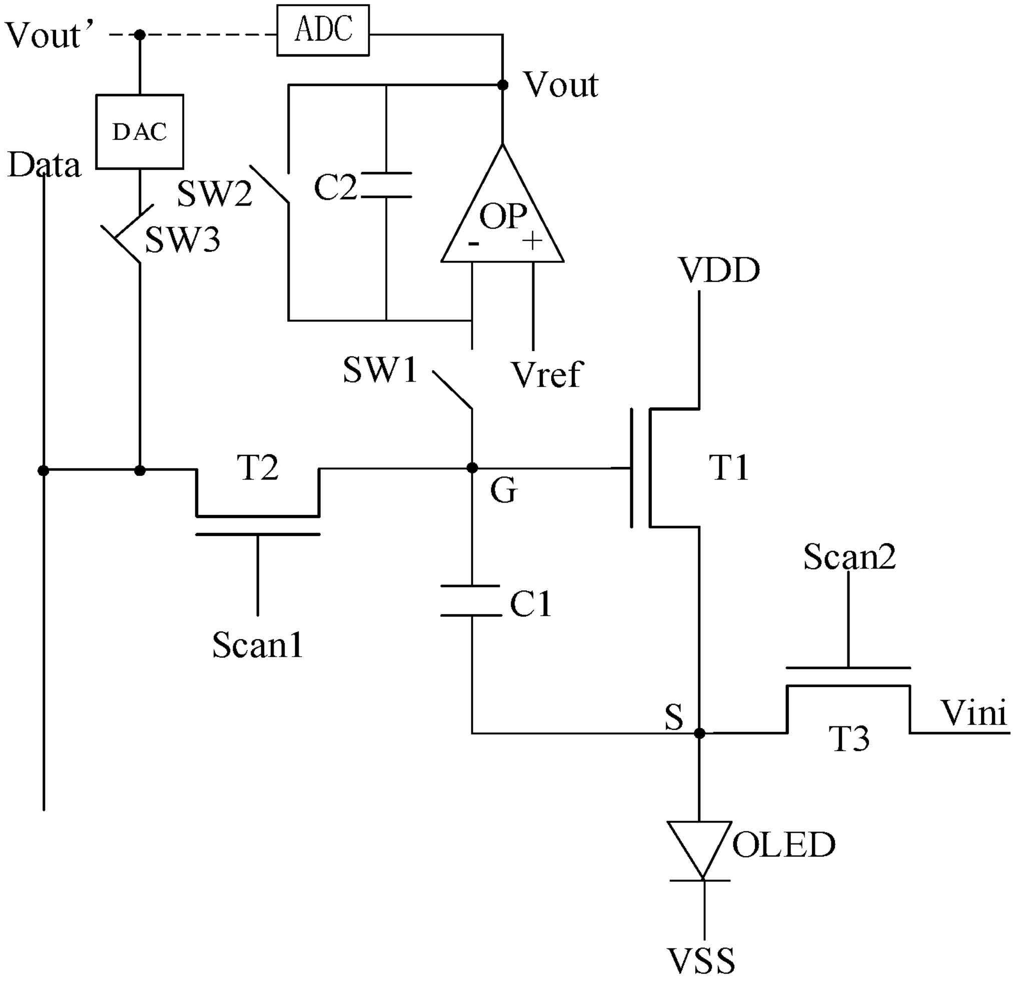
FIG. 6 is a state diagram of a fourth period of the pixel driving circuit provided by one embodiment of the present application.

As shown in FIG. 6, in the fourth period t4, the first switch SW1 and the second switch SW2 are turned off, the third switch SW3 is turned on, the data writing module 200 and the initialization module 300 are turned on, and the driving module 100 changes from turned off to turned on.

Figure 7:
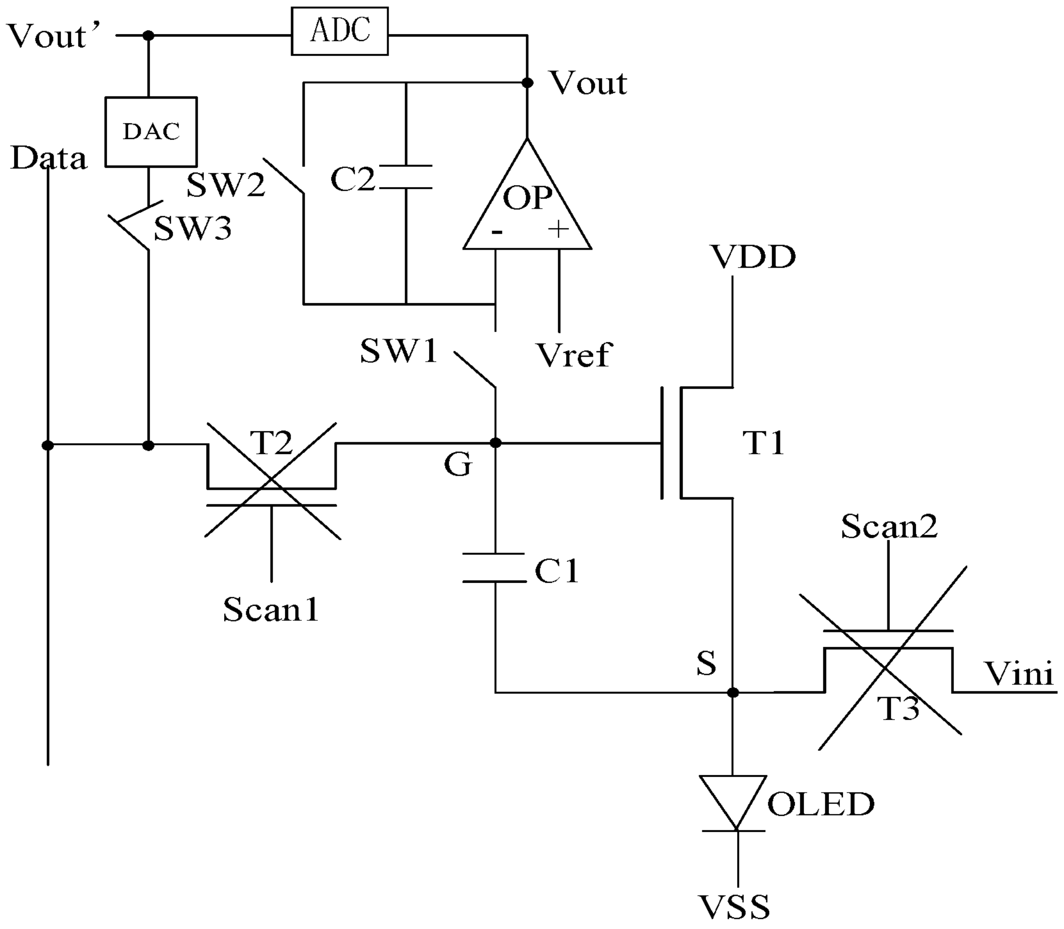
FIG. 7 is a state diagram of a fifth period of the pixel driving circuit provided by one embodiment of the present application.
Figure 8:
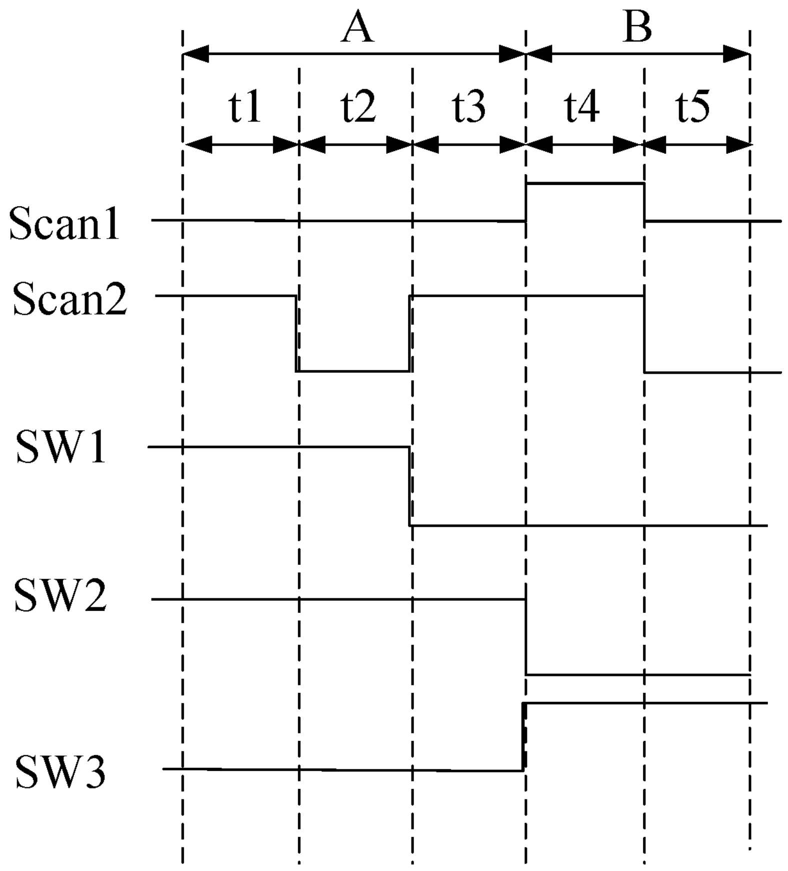
FIG. 8 is a time sequence diagram of the pixel driving circuit provided by one embodiment of the present application.

As shown in FIG. 7, in the fifth period t5, the first switch SW1 and the second switch SW2 are turned off, the third switch SW3 is turned on, the driving module 100 is turned on, and the data writing module 200 and the initialization module 300 are turned off.

In the fourth period t4 and the fifth period t5, the electrical potential Vdata+Vth+Vini of the first node G is a sum of an electrical potential Vdata of the data signal line, the threshold voltage Vth of the first thin film transistor T1, and the electrical potential Vini of the reset signal line, The electrical potential of the second node S is the electrical potential Vini of the reference signal line.

Based on the above embodiment, if the first thin film transistor T1, the second thin film transistor T2, and the third thin film transistor T3 are all N-type thin film transistors, the control signals corresponding to the first switch SW1, the second switch SW2, and the third switch SW3 are high electrical turned on, and the corresponding control signals are low electrical potential are low electrical turned off. With reference to FIGS. 3 to 8, the operating process of the pixel driving circuit (threshold voltage detection stage A and display compensation stage B) is described in detail as follows:

First, the threshold voltage detection stage A includes the first period t1, the second period t2, and the third period t3.

As shown in FIG. 3, the first time period t1 is used to initialize the electrical potentials of the first node G and the second node S. Specifically, the first switch SW1 and the second switch SW2 are turned on, and the third switch SW3 is turned off. Based on the virtual short characteristic of the operational amplifier OP, the operational amplifier OP can be used as a voltage follower to make the electrical potential of the first node G is the electrical potential Vref of the reference signal line. The first scan signal line Scan1 is at low electrical potential and the second scan signal line Scan2 is at the high electrical potential, so that the second thin film transistor T2 is turned off and the third thin film transistor T3 is turned on, so that the electrical potential of the second node S is the electrical potential Vini of the reset signal line, so that the gate-source potential difference Vgs of the first thin film transistor T1 is Vref−Vini to turned on the first thin film transistor T1, and the first capacitor C1 is charged.

As shown in FIG. 4, the second time period t2 is used to detect the threshold voltage of the first thin film transistor T1. Specifically, the second scan signal line Scan2 changes to the low electrical potential, turning off the third thin film transistor T3, and the constant voltage terminal of high electrical potential VDD charges the second node S until an electrical potential difference between the first node G and the second node S decrease from Vref−Vini to the threshold voltage Vth of the first thin film transistor T1, thereby turning off the first thin film transistor T1. During this process, the first capacitor C1 is discharged to maintain the first thin film transistor T1 in an on state. It should be noted that in the second time period t2, the electrical potential of the second node S, that is, during the period from Vini to Vref−Vth, needs to be lower than a turn-on voltage Voled of the organic light-emitting diode OLED to prevent the organic light emitting diode OLED from emitting light.

As shown in FIG. 5, the third period t3 is used to extract the threshold voltage Vth of the first thin film transistor T1. Specifically, the second switch SW2 is turned off, to make the operational amplifier OP and the second capacitor C2 form an integrator. The second scan signal line Scan2 is at a high electrical potential, and the third thin film transistor T3 is turned on to make the electrical potential of the second node S to the electrical potential Vin of the reset signal line, charge transfer is performed between the first capacitor C1 and the second capacitor C2, and the integrator generates an output voltage Vout after integration.

It should be noted that since the net charge stored on the two plates of each capacitor is 0, that is, the amount of charge stored on the two plates of each capacitor is the same, but the electrical properties are opposite. According to a principle of conservation of charge in the closed surface, in FIG. 5, a closed surface 500 surrounds the first terminal of the first capacitor C1 and the second terminal of the second capacitor C2. Since there is no charge storage element in the closed surface 500 and no conductive path passes through the closed surface 500, in the closed surface 500, a total charge stored on the two plates of the first terminal of the first capacitor C1 and the second terminal of the second capacitor C2 connected to the first node G will not change.

Based on this, in the second period t2, the charge stored at the first terminal of the first capacitor C1 is Q1=C1*Vth, and the electrical potentials of the first terminal and the second terminal of the second capacitor C2 are the same, so that the second capacitor C2 does not store charge. Therefore, the charge stored at the second terminal of the second capacitor C2 is Q2=0, that is, the total charge stored at the first terminal of the first capacitor C1 and the second terminal of the second capacitor C2 is Q=Q1+Q2=C1*Vth.

In the third period t3, the charge stored at the first terminal of the first capacitor C1 is Q1=C1*(Vref−Vini), and the charge stored at the second terminal of the second capacitor C2 is Q2'=C2*(Vref−Vout). That is, the total charge stored in the first terminal of the first capacitor C1 and the second terminal of the second capacitor C2 is Q'=Q1'+Q2'=C1*(Vref−Vini)+C2*(Vref−Vout).

According to Q=Q', C1*Vth=C1*(Vref−Vini)+C2*(Vref−Vout), therefore: Vth=Vref−Vini+C2*(Vref−Vout)/C1, so as to extract the threshold voltage of the first thin film transistor T1.

Further, the display compensation stage B includes a fourth period t4 and a fifth period t5.

As shown in FIG. 6, the fourth period t4 is used for writing the compensated data signal Data. Specifically, the first scan signal line Scan1 and the second scan signal line Scan2 are at the high electrical potential, the second thin film transistor T2 and the third thin film transistor T3 are turned on, and the electrical potential of the second node S is the electrical potential Vini of the reset signal line. The first switch SW1 and the second switch SW2 are turned off. The third switch SW3 is turned on. The threshold voltage Vth of the first thin film transistor T1 extracted in the third period t3 and the electrical potential Vini of the reset signal line are superimposed to the electrical potential of the data signal line Vdata that needs to be input. That is, the voltage Vout' that needs to be compensated for the data signal Data=Vth+Vini, the electrical potential of the compensated data signal Data is Vdata+Vth+Vini, so that the electrical potential difference between the first node G and the second node of S is Vdata+Vth, so that the first thin film transistor T1 is turned on.

As shown in FIG. 7, the fifth period t5 is used to drive the organic light emitting diode OLED to emit light. Specifically, the second scan signal line Scan changes to the low electrical potential to turn off the third thin film transistor T3. At this time, the electrical potential of the first node G is the electrical potential Vdata+Vth+Vin of the compensated data signal, which is Vdata+Vref+C2*(Vref−Vout)/C1, the constant voltage terminal of high electrical potential VDD drives the organic light emitting diode OLED to emit light through the first thin film transistor T1. The current flowing through the first thin film transistor T1, that is, the driving current I of the organic light emitting diode is: $I=K(Vgs-Vth)^2=K(Vdata+Vth+Vin-Vni-Vth)^2=K(Vdata)^2$. It can be seen that the driving current I and the threshold voltage of the first thin film transistor T1 Vth is irrelevant. Therefore, the threshold voltage Vth of the first thin film transistor T1 is cancelled to avoid an influence of the threshold voltage Vth of the first thin film transistor T1 on the organic light emitting diode, thereby compensating the threshold voltage of the first thin film transistor T1, so that the luminous brightness of each pixel are not affected by the unevenness or instability of the threshold voltage, and the display effect of the display panel can be improved.

It should be noted that the display process of each frame of image includes a normal display process (organic light-emitting diode OLED emits light) and a field blanking process (organic light-emitting diode OLED does not emit light). Generally, the display compensation stage is performed during the normal display process. The threshold voltage detection stage is performed during the field blanking process, so that the threshold voltage detection does not affect the normal display process.

The pixel driving circuit provided by the embodiment of the present application connects the operational amplifier of the compensation module to the gate electrode of the driving transistor, so that when the threshold voltage of the driving transistor is detected, the gate electrical potential of the driving transistor can be stabilized by the compensation module, to make the detected threshold voltage of the driving transistor accurate, thereby accurately compensating the threshold voltage of the driving transistor.

Based on the foregoing embodiment, one embodiment of the present application also provides a display panel including an organic light emitting diode, and the pixel driving circuit described above. The pixel driving circuit is used to drive the organic light emitting diode to emit light. The display panel and the pixel driving circuit have a same structure and beneficial effects. Since the above-mentioned embodiments have described the pixel driving circuit in detail, it will not be repeated here.

In the above-mentioned embodiments, the description of each embodiment has its own focus. For parts that are not described in detail in one embodiment, reference may be made to related descriptions of other embodiments.

The description of the above embodiments is only used to help understand the technical solutions and core ideas of the present application. Those of ordinary skill in the art should understand that they can still modify the technical solutions described in the foregoing embodiments, or equivalently replaced some of the technical features. These modifications or replacements do not cause the essence of the corresponding technical solutions to deviate from a scope of the technical solutions of the embodiments of the present application.

What is claimed is:

1. A pixel driving circuit, comprising: a driving module, a data writing module, an initialization module, a first capacitor, a detection module and a compensation module;

wherein a control terminal of the driving module is connected to a first node, and wherein an input terminal of the driving module is connected to a constant voltage terminal of high electrical potential, and wherein an output terminal is connected to a second node, the driving module comprises a first thin film transistor;

wherein a control terminal of the data writing module is connected to a first scan signal line, and wherein an input terminal of the data writing module is connected to a data signal line, and wherein an output terminal of the data writing module is connected to the first node;

wherein a control terminal of the initialization module is connected to a second scan signal line, and wherein an input terminal of the initialization module is connected to a reset signal line, and wherein an output terminal of the initialization module is connected to the second node;

wherein a first terminal of the first capacitor is connected to the first node, and wherein a second terminal of the first capacitor is connected to the second node; and wherein the detection module comprises an operational amplifier, a first switch, a second switch, and a second capacitor, the detection module is connected to the first node and is configured to control an electrical potential of the first node to obtain a threshold voltage of the driving module, wherein a first input terminal of the operational amplifier is connected to the first node through the first switch, and wherein a second input terminal of the operational amplifier is connected to a reference signal line, wherein the first switch is coupled between the first node and the first input terminal of the operational amplifier; and wherein the second switch and the second capacitor are coupled between the first input terminal of the operational amplifier and an output terminal of the operational amplifier;

wherein the compensation module comprises an analog-to-digital converter, a control device, a digital-to-analog converter, and a third switch, an input terminal of the analog-to-digital converter is connected to the output terminal of the operational amplifier, the analog-to-digital converter is connected to the digital-to-analog converter through the control device, the control device is configured to superimpose a compensation voltage to a data signal from the data signal line, an output terminal of the digital-to-analog converter is connected to an input terminal of the data writing module through the third switch, wherein the third switch is configured to be turned on when the first switch and the second switch are turned off, such that an electrical potential difference between the first node and the second node is a sum of an electrical potential of the data signal and the threshold voltage, and the first thin film transistor is turned on, wherein the third switch is configured to be turned on when the first switch and the second switch are turned off, such that a current flowing through the first thin film transistor is not a function of the threshold voltage and is a function of only the data signal.

2. The pixel driving circuit according to claim 1, wherein a gate electrode of the first thin film transistor is connected to the first node, and wherein a source electrode of the first thin film transistor is connected to the second node, and wherein a drain electrode of the first thin film transistor is connected to the constant voltage terminal of high electrical potential.

3. The pixel driving circuit according to claim 1, wherein the data writing module comprises a second thin film transistor, and wherein a gate electrode of the second thin film transistor is connected to the first scan signal line, and wherein a source electrode of the second thin film transistor is connected to the data signal line, and wherein a drain electrode of the second thin film transistor is connected to the first node.

4. The pixel drive circuit according to claim 1, characterized in that the initialization module comprises a third thin film transistor, wherein a gate electrode of the third thin film transistor is connected to the second scan signal line, and wherein a source electrode of the third thin film transistor is connected to the reset signal line, and wherein a drain electrode of the third thin film transistor is connected to the second node.

5. The pixel driving circuit according to claim 1, further comprising a threshold voltage detection stage, wherein the threshold voltage detection stage comprises a first period, a second period, and a third period;

wherein in the first period, the first switch and the second switch are turned on, the third switch is turned off, the data writing module is turned off, and the initialization module and the driving module are turned on;

wherein in the second period, the first switch and the second switch are turned on, the third switch is turned off, the data writing module and the initialization module are turned off, and the driving module changes from turned on to turned off; and wherein in the third period, the first switch is turned on, the second switch and the third switch are turned off, the data writing module and the driving module are turned off, and the initialization module is turned on.

6. The pixel driving circuit according to claim 5, wherein in the first period, an electrical potential of the first node is an electrical potential of the constant voltage terminal of high electrical potential VDD, and an electrical potential of the second node is an electrical potential Vini of the reference signal line;

wherein in the second period, the electrical potential of the first node is the electrical potential Vref of the reference signal line, and the electrical potential of the second node is a difference between the electrical potential Vref of the reference signal line and a threshold voltage Vth of the driving module;

wherein in the third period, the electrical potential of the first node is the electrical potential Vref of the reference signal line, and the electrical potential of the second node is the electrical potential Vini of the reference signal line.

7. The pixel driving circuit according to claim 1, further comprising a display compensation stage, wherein the display compensation stage comprises a fourth period and a fifth period;

wherein in the fourth period, the first switch and the second switch are turned off, the third switch is turned on, the data writing module and the initialization module are turned on, and the driving module changes from turned off to turned on;

wherein in the fifth period, the first switch and the second switch are turned off, the third switch is turned on, the driving module is turned on, and the data writing module and the initialization module are turned off.

8. The pixel driving circuit according to claim 7, wherein in the fourth period and the fifth period, the electrical potential of the first node is a sum of an electrical potential Vdata of the data signal line, the threshold voltage Vth of the driving module, and the electrical potential Vini of the reset signal line, and wherein the electrical potential of the second node is the electrical potential Vini of the reference signal line.

9. A display panel, further comprising an organic light emitting diode and a pixel driving circuit, the pixel driving circuit comprising: a driving module, a data writing module, an initialization module, a first capacitor, a detection module and a compensation module;

wherein a control terminal of the driving module is connected to a first node, and wherein an input terminal of the driving module is connected to a constant voltage terminal of high electrical potential, and wherein an output terminal is connected to a second node, the driving module comprises a first thin film transistor;

wherein a control terminal of the data writing module is connected to a first scan signal line, and wherein an input terminal of the data writing module is connected to a data signal line, and wherein an output terminal of the data writing module is connected to the first node;

wherein a control terminal of the initialization module is connected to a second scan signal line, and wherein an input terminal of the initialization module is connected to a reset signal line, and wherein an output terminal of the initialization module is connected to the second node;

wherein a first terminal of the first capacitor is connected to the first node, and wherein a second terminal of the first capacitor is connected to the second node; and wherein the detection module comprises an operational amplifier, a first switch, a second switch, and a second capacitor, the detection module is connected to the first node and is configured to control an electrical potential of the first node to obtain a threshold voltage of the driving module, wherein a first input terminal of the operational amplifier is connected to the first node through the first switch, and wherein a second input terminal of the operational amplifier is connected to a reference signal line, wherein the first switch is coupled between the first node and the first input terminal of the operational amplifier; and wherein the second switch and the second capacitor are coupled between the first input terminal of the operational amplifier and an output terminal of the operational amplifier;

wherein the compensation module comprises an analog-to-digital converter, a control device, a digital-to-analog converter, and a third switch, an input terminal of the analog-to-digital converter is connected to the output terminal of the operational amplifier, the analog-to-digital converter is connected to the digital-to-analog converter through the control device, the control device is configured to superimpose a compensation voltage to a data signal from the data signal line, an output terminal of the digital-to-analog converter is connected to an input terminal of the data writing module through the third switch, wherein the third switch is configured to be turned on when the first switch and the second switch are turned off, such that an electrical potential difference between the first node and the second node is a sum of an electrical potential of the data signal and the threshold voltage, and the first thin film transistor is turned on, wherein the third switch is configured to be turned on when the first switch and the second switch are turned off, such that a current flowing through the first thin film transistor is not a function of the threshold voltage and is a function of only the data signal;

wherein the organic light emitting diode is coupled between the output terminal of the driving module of the pixel driving circuit and the constant voltage terminal of low electrical potential, to make the pixel driving circuit configured to drive the organic light emitting diode to emit light.

10. The display panel according to claim 9, wherein a gate electrode of the first thin film transistor is connected to the first node, and wherein a source electrode of the first thin film transistor is connected to the second node, and wherein a drain electrode of the first thin film transistor is connected to the constant voltage terminal of high electrical potential.

11. The display panel according to claim 9, wherein the data writing module comprises a second thin film transistor, and wherein a gate electrode of the second thin film transistor is connected to the first scan signal line, and wherein a source electrode of the second thin film transistor is connected to the data signal line, and wherein a drain electrode of the second thin film transistor is connected to the first node.

12. The display panel according to claim 9, wherein the pixel driving circuit further comprises a threshold voltage detection stage, wherein the threshold voltage detection stage comprises a first period, a second period, and a third period;

wherein in the first period, the first switch and the second switch are turned on, the third switch is turned off, the data writing module is turned off, and the initialization module and the driving module are turned on;

wherein in the second period, the first switch and the second switch are turned on, the third switch is turned off, the data writing module and the initialization module are turned off, and the driving module changes from turned on to turned off; and wherein in the third period, the first switch is turned on, the second switch and the third switch are turned off, the data writing module and the driving module are turned off, and the initialization module is turned on.

13. The display panel according to claim 12, wherein in the first period, an electrical potential of the first node is an electrical potential of the constant voltage terminal of high electrical potential VDD, and an electrical potential of the second node is an electrical potential Vini of the reference signal line;

wherein in the second period, the electrical potential of the first node is the electrical potential Vref of the reference signal line, and the electrical potential of the second node is a difference between the electrical potential Vref of the reference signal line and a threshold voltage Vth of the driving module;

wherein in the third period, the electrical potential of the first node is the electrical potential Vref of the reference signal line, and the electrical potential of the second node is the electrical potential Vini of the reference signal line.

14. The display panel according to claim 9, wherein the pixel driving circuit further comprises a display compensation stage, wherein the display compensation stage comprises a fourth period and a fifth period;

wherein in the fourth period, the first switch and the second switch are turned off, the third switch is turned on, the data writing module and the initialization module are turned on, and the driving module changes from turned off to turned on;

wherein in the fifth period, the first switch and the second switch are turned off, the third switch is turned on, the driving module is turned on, and the data writing module and the initialization module are turned off.

15. The display panel according to claim 14, wherein in the fourth period and the fifth period, the electrical potential of the first node is a sum of an electrical potential Vdata of the data signal line, the threshold voltage Vth of the driving module, and the electrical potential Vini of the reset signal line, and wherein the electrical potential of the second node is the electrical potential Vini of the reference signal line.

* * * * *